United States Patent
Mizrahi et al.

(10) Patent No.: US 9,715,390 B2
(45) Date of Patent: Jul. 25, 2017

(54) RUN-TIME PARALLELIZATION OF CODE EXECUTION BASED ON AN APPROXIMATE REGISTER-ACCESS SPECIFICATION

(71) Applicant: Centipede Semi Ltd., Natanya (IL)

(72) Inventors: Noam Mizrahi, Hod Hasharon (IL); Alberto Mandler, Zichron Yaakov (IL); Shay Koren, Tel-Aviv (IL); Jonathan Friedmann, Even Yehuda (IL)

(73) Assignee: CENTIPEDE SEMI LTD., Netanya (IL)

( * ) Notice: Subject to any disclaimer, the term of this patent is extended or adjusted under 35 U.S.C. 154(b) by 29 days.

(21) Appl. No.: 14/690,424

(22) Filed: Apr. 19, 2015

(65) Prior Publication Data

US 2016/0306633 A1 Oct. 20, 2016

(51) Int. Cl.
*G06F 9/38* (2006.01)
*G06F 12/0831* (2016.01)

(52) U.S. Cl.
CPC ............ *G06F 9/3861* (2013.01); *G06F 9/382* (2013.01); *G06F 9/3808* (2013.01); *G06F 9/3838* (2013.01); *G06F 9/3851* (2013.01); *G06F 9/3857* (2013.01); *G06F 9/3875* (2013.01); *G06F 12/0833* (2013.01)

(58) Field of Classification Search
CPC ..... G06F 9/3838; G06F 9/3851; G06F 9/3857
USPC ........................................ 712/217, 216, 219
See application file for complete search history.

(56) References Cited

U.S. PATENT DOCUMENTS

| | | | |
|---|---|---|---|
| 5,394,529 A | 2/1995 | Brown, III et al. | |
| 5,488,729 A | 1/1996 | Vegesna et al. | |
| 5,488,730 A | 1/1996 | Brown, III et al. | |
| 5,966,537 A | 10/1999 | Ravichandran | |
| 5,974,538 A | 10/1999 | Wilmot, II | |
| 6,035,120 A | 3/2000 | Ravichandran | |
| 6,092,180 A | 7/2000 | Anderson et al. | |
| 6,157,998 A | 12/2000 | Rupley, II et al. | |
| 6,182,210 B1 | 1/2001 | Akkary et al. | |

(Continued)

FOREIGN PATENT DOCUMENTS

EP 2239657 B1 11/2012
EP 2778907 A2 9/2014

OTHER PUBLICATIONS

Ortiz-Arroyo et al., "Dynamic Simultaneous Multithreaded Architecture", Proceedings of ISCA's 16th International Conference on Parallel and Distributed Computing Systems (PDCS'03), 9 pages, year 2003.

(Continued)

*Primary Examiner* — Yuqing Xiao
(74) *Attorney, Agent, or Firm* — D. Kligler IP Services Ltd.

(57) ABSTRACT

A method includes, in a processor that processes instructions of program code, processing a first segment of the instructions. One or more destination registers are identified in the first segment using an approximate specification of register access by the instructions. Respective values of the destination registers are made available to a second segment of the instructions only upon verifying that the values are valid for readout by the second segment in accordance with the approximate specification. The second segment is processed at least partially in parallel with processing of the first segment, using the values made available from the first segment.

27 Claims, 2 Drawing Sheets

(56) References Cited

U.S. PATENT DOCUMENTS

| | | | |
|---|---|---|---|
| 6,202,205 B1 | 3/2001 | Saboff et al. | |
| 6,308,175 B1 | 10/2001 | Lang et al. | |
| 6,463,522 B1 | 10/2002 | Akkary | |
| 6,493,820 B2 | 12/2002 | Akkary et al. | |
| 6,505,345 B1 | 1/2003 | Chen et al. | |
| 6,516,409 B1 | 2/2003 | Sato | |
| 6,658,447 B2 | 12/2003 | Cota-Robles | |
| 6,772,324 B2 | 8/2004 | Akkary et al. | |
| 6,826,752 B1 | 11/2004 | Thornley et al. | |
| 7,065,759 B2 | 6/2006 | Hank | |
| 7,313,675 B2 | 12/2007 | Latorre et al. | |
| 7,313,676 B2 | 12/2007 | Brekelbaum et al. | |
| 7,366,880 B2 | 4/2008 | Chaudhry et al. | |
| 7,401,329 B2 | 7/2008 | De Rijck | |
| 7,434,032 B1 | 10/2008 | Coon et al. | |
| 7,478,198 B2 | 1/2009 | Latorre et al. | |
| 7,526,637 B2 | 4/2009 | Jung et al. | |
| 7,571,302 B1 | 8/2009 | Chen et al. | |
| 7,596,781 B2 | 9/2009 | Fulton et al. | |
| 7,650,485 B1* | 1/2010 | Chou | 712/214 |
| 7,681,187 B2 | 3/2010 | Ludwig et al. | |
| 7,779,069 B2 | 8/2010 | Frid-Nielsen et al. | |
| 7,840,954 B2 | 11/2010 | Gschwind | |
| 7,882,381 B2 | 2/2011 | Wyatt | |
| 8,006,235 B2 | 8/2011 | Broman et al. | |
| 8,056,061 B2 | 11/2011 | Lee et al. | |
| 8,166,467 B2 | 4/2012 | Biswas et al. | |
| 8,181,170 B2 | 5/2012 | Patil et al. | |
| 8,185,882 B2 | 5/2012 | Patel et al. | |
| 8,196,117 B2 | 6/2012 | Lafrance-Linden | |
| 8,230,411 B1 | 7/2012 | Vorbach et al. | |
| 8,261,046 B2 | 9/2012 | Gibert et al. | |
| 8,291,197 B2 | 10/2012 | Wu et al. | |
| 8,402,429 B2 | 3/2013 | Kielstra | |
| 8,438,370 B1 | 5/2013 | Budge | |
| 8,572,595 B1 | 10/2013 | Lethin et al. | |
| 8,612,949 B2 | 12/2013 | Liao et al. | |
| 8,667,471 B2 | 3/2014 | Wintergerst et al. | |
| 8,677,337 B2 | 3/2014 | Song et al. | |
| 8,719,806 B2 | 5/2014 | Wang et al. | |
| 8,843,901 B2 | 9/2014 | Krajec et al. | |
| 9,015,687 B2 | 4/2015 | George | |
| 9,170,792 B2* | 10/2015 | Park | G06F 8/4452 |
| 2002/0144092 A1 | 10/2002 | Topham et al. | |
| 2003/0135711 A1 | 7/2003 | Shoemaker et al. | |
| 2003/0167460 A1 | 9/2003 | Desai et al. | |
| 2004/0073906 A1 | 4/2004 | Chamdani et al. | |
| 2004/0098570 A1 | 5/2004 | Giri | |
| 2004/0154010 A1 | 8/2004 | Marcuello et al. | |
| 2004/0193857 A1 | 9/2004 | Miller et al. | |
| 2005/0132376 A1 | 6/2005 | Rodgers et al. | |
| 2005/0172277 A1 | 8/2005 | Chheda et al. | |
| 2006/0026411 A1 | 2/2006 | Yoshida | |
| 2006/0047495 A1 | 3/2006 | Sanchez et al. | |
| 2006/0095732 A1 | 5/2006 | Tran et al. | |
| 2006/0227966 A1 | 10/2006 | Knowles | |
| 2008/0134196 A1 | 6/2008 | Madriles et al. | |
| 2008/0162272 A1 | 7/2008 | Huang et al. | |
| 2008/0163230 A1 | 7/2008 | Latorre et al. | |
| 2008/0167846 A1 | 7/2008 | Bugenhagen | |
| 2008/0307403 A1 | 12/2008 | Heishi | |
| 2008/0320276 A1 | 12/2008 | Krottendorfer et al. | |
| 2009/0063823 A1 | 3/2009 | Burky et al. | |
| 2009/0138690 A1 | 5/2009 | Luick | |
| 2009/0172362 A1 | 7/2009 | Shen et al. | |
| 2009/0228690 A1 | 9/2009 | Muff et al. | |
| 2009/0327674 A1 | 12/2009 | Codrescu et al. | |
| 2010/0161948 A1* | 6/2010 | Abdallah | 712/228 |
| 2010/0269102 A1 | 10/2010 | Latorre et al. | |
| 2011/0161643 A1 | 6/2011 | Eichenberger et al. | |
| 2011/0167247 A1 | 7/2011 | Gibbs et al. | |
| 2011/0320787 A1 | 12/2011 | Dieffenderfer et al. | |
| 2012/0079146 A1 | 3/2012 | Hesse | |
| 2013/0091340 A1 | 4/2013 | Abdallah | |
| 2013/0125097 A1 | 5/2013 | Ebcioglu et al. | |
| 2013/0232476 A1 | 9/2013 | Varma et al. | |
| 2014/0019726 A1 | 1/2014 | Toi et al. | |
| 2014/0215187 A1 | 7/2014 | Yazdani | |
| 2014/0281435 A1 | 9/2014 | Perkins et al. | |
| 2014/0282592 A1 | 9/2014 | Abdallah | |
| 2014/0282601 A1 | 9/2014 | Abdallah | |
| 2014/0317387 A1 | 10/2014 | Abdallah | |
| 2015/0220341 A1* | 8/2015 | Ohannessian, Jr. | G06F 9/30098 712/217 |

OTHER PUBLICATIONS

Ortiz-Arroyo, D.,"Efficient Resource Allocation on a Dynamic Simultaneous Multithreaded Architecture", Computer Science and Engineering Department, Aalborg University, Denmark, 5 pages, year 2006.

Marcuello et al., "Thread-Spawning Schemes for Speculative Multithreading", Proceedings of the Eighth International Symposium on High-Performance Computer Architecture (HPC02), pp. 55-64, Feb. 2-6, 2002.

Marcuello et al., "Clustered Speculative Multithreaded Processors", Proceedings of the 13th international conference on Supercomputing (ICS '99), pp. 365-372, year 1999.

Marcuello et al., "Speculative Multithreaded Processors", Proceedings of the 12th international conference on Supercomputing (ICS '98), pp. 77-84, year 1998.

Cazorla et al., "Dynamically Controlled Resource Allocation in SMT Processors", Proceedings of the 37th International Symposium on Microarchitecture (MICRO-37'04), pp. 171-182, year 2004.

Akkary et al., "A Dynamic Multithreading Processor", Proceedings of the 31st annual ACM/IEEE international symposium on Microarchitecture (MICRO-31), pp. 226-236, Dec. 2, 1998.

Ranjan et al., "P-Slice Based Efficient Speculative Multithreading", International Conference on High Performance Computing (HiPC), pp. 119-128, Dec. 16-19, 2009.

Sohi et al., "Speculative Multithreaded Processors", IEEE Computer, vol. 34, issue 4, pp. 66-73, Apr. 2001.

Roth et al., "Register Integration: A Simple and Efficient Implementation of Squash Reuse", Proceedings of the 33rd Annual International Symposium on Microarchitecture (MICRO-33), 12 pages, Dec. 10-13, 2000.

Roth, A., "Pre-Execuion via Speculative Data-Driven Multithreading", A dissertation submitted in partial fulfillment of the requirements for the degree of Doctor of Philosophy (Computer Sciences), University of Wisconsin Madison, 375 pages, year 2001.

Jacobson et al., "Path-Based Next Trace Prediction", Proceedings of Micro-30, 11 pages, Dec. 1-3, 1997.

Tubella et al., "Control Speculation in Multithreaded Processors through Dynamic Loop Detection", Proceedings of the 4th International High-Performance Computer Architecture Symposium, pp. 14-23, Feb. 1-4, 1998.

Zier et al., "Performance Evaluation of Dynamic Speculative Multithreading with the Cascadia Architecture", IEEE Transactions on Parallel and Distributed Systems, vol. 21, No. 1, pp. 47-59, Jan. 2010.

Zier, "The Dynamic Speculation and Performance Prediction of Parallel Loops", Dissertation for the degree of Doctor of Philosophy in Electrical and Computer Engineering, Oregon State University, 146 pages, May 1, 2009.

De Alba et al., "Characterization and Evaluation of Hardware Loop Unrolling", Boston Area Architecture Workshop (BARC-2003), 18 pages, Jan. 2003.

Collins et al., "Clustered Multithreaded Architectures-Pursuing Both IPC and Cycle Time", Proceedings of the 18th International Parallel and Distributed Processing Symposium, 10 pages, Apr. 2004.

Mizrahi et al., U.S. Appl. No. 14/578,518, filed Dec. 22, 2014.

Mizrahi et al., U.S. Appl. No. 14/583,119, filed Dec. 25, 2014.

Patel et al., "rePlay: A Hardware Framework for Dynamic Optimization", IEEE Transactions on Computers, vol. 50, No. 6, pp. 590-608, Jun. 2001.

(56) References Cited

OTHER PUBLICATIONS

Shen et al., Modern Processing Design: Fundamentals of Superscalar Processors, Chapter 4.2, pp. 159-164, 2002.
U.S. Appl. No. 14/583,119 Office Action dated Apr. 14, 2015.
Mizrahi et al., U.S. Appl. No. 14/578,516, filed Dec. 22, 2014.
Mizrahi et al., U.S. Appl. No. 14/673,884, filed Mar. 31, 2015.
Mizrahi et al., U.S. Appl. No. 14/637,418, filed Mar. 4, 2015.
Mizrahi et al., U.S. Appl. No. 14/673,889, filed Mar. 31, 2015.
U.S. Appl. No. 14/578,516 Office Action dated May 21, 2015.
U.S. Appl. No. 14/583,119 Office Action dated May 28, 2015.
U.S. Appl. No. 14/637,418 Office Action dated May 28, 2015.
Moseley et al., "Identifying potential parallelism via loop-centric profiling", ACM, 9 pages, May 7-9, 2007.
U.S. Appl. No. 14/578,518 Office Action dated Jun. 19, 2015.
Marcuello et al., "A Quantitative Assessment of Thread-Level Speculation Techniques", Proceedings of the 14th International Parallel and Distributed Processing Symposium, 7 pages, May 1-5, 2000.
Mishra at al., "Specification-driven Directed Test Generation for Validation of Pipelined Processors", ACM Transactions on Design Automation of Electronic Systems, vol. 13, No. 3, article 42, pp. 42:1-42:36, Jul. 2008.
Rosner et al., "Power Awareness through Selective Dynamically Optimized Traces", Proceedings of the 31st annual international symposium on computer architecture, vol. 32, issue 2, 12 pages, Mar. 2004.
Sami et al., "Exploiting data forwarding to reduce the power budget of VLIW embedded processors", IEEE Proceedings of the Conference on Design, Automation and Test in Europe, Munich, Germany, pp. 252-257, Mar. 13-16, 2001.
Lazarescu et al., "Dynamic Trace-Based Data Dependency Analysis for Parallelization of C Programs", 2012 IEEE 12th International Working Conference on Source Code Analysis and Manipulation (SCAM), pp. 126-131, Sep. 23-24, 2012.
Sohi et al., "Speculative Multithreaded Processors", Computer Sciences Department, University of Wisconsin-Madison, 12 pages, 2001.
International Application # PCT/IB2015/059468 Search Report dated Apr. 7, 2016.
International Application # PCT/IB2015/059469 Search Report dated Mar. 31, 2016.
International Application # PCT/IB2015/059467 Search Report dated Apr. 12, 2016.
International Application # PCT/IB2015/059470 Search Report dated Mar. 29, 2016.
International Application # PCT/IB2016/050562 Search Report dated May 11, 2016.

\* cited by examiner

US 9,715,390 B2

RUN-TIME PARALLELIZATION OF CODE EXECUTION BASED ON AN APPROXIMATE REGISTER-ACCESS SPECIFICATION

FIELD OF THE INVENTION

The present invention relates generally to processor design, and particularly to methods and systems for run-time code parallelization.

BACKGROUND OF THE INVENTION

Various techniques have been proposed for dynamically parallelizing software code at run-time. For example, Akkary and Driscoll describe a processor architecture that enables dynamic multithreading execution of a single program, in "A Dynamic Multithreading Processor," Proceedings of the 31$^{st}$ Annual International Symposium on Microarchitectures, December, 1998, which is incorporated herein by reference.

Marcuello et al., describe a processor microarchitecture that simultaneously executes multiple threads of control obtained from a single program by means of control speculation techniques that do not require compiler or user support, in "Speculative Multithreaded Processors," Proceedings of the 12$^{th}$ International Conference on Supercomputing, 1998, which is incorporated herein by reference.

Marcuello and Gonzales present a microarchitecture that spawns speculative threads from a single-thread application at run-time, in "Clustered Speculative Multithreaded Processors," Proceedings of the 13$^{th}$ International Conference on Supercomputing, 1999, which is incorporated herein by reference.

In "A Quantitative Assessment of Thread-Level Speculation Techniques," Proceedings of the 14th International Parallel and Distributed Processing Symposium, 2000, which is incorporated herein by reference, Marcuello and Gonzales analyze the benefits of different thread speculation techniques and the impact of value prediction, branch prediction, thread initialization overhead and connectivity among thread units.

Ortiz-Arroyo and Lee describe a multithreading architecture called Dynamic Simultaneous Multithreading (DSMT) that executes multiple threads from a single program on a simultaneous multithreading processor core, in "Dynamic Simultaneous Multithreaded Architecture," Proceedings of the 16$^{th}$ International Conference on Parallel and Distributed Computing Systems (PDCS'03), 2003, which is incorporated herein by reference.

U.S. Patent Application Publication 2014/0282601, whose disclosure is incorporated herein by reference, describes a method for dependency broadcasting through a block-organized source-view data structure. The method includes receiving an incoming instruction sequence using a global front end, and grouping the instructions to form instruction blocks. A plurality of register templates is used to track instruction destinations and instruction sources by populating the register template with block numbers corresponding to the instruction blocks, wherein the block numbers corresponding to the instruction blocks indicate interdependencies among the blocks of instructions. A block-organized source-view data structure is populated, wherein the source-view data structure stores sources corresponding to the instruction blocks as recorded by the plurality of register templates. Upon dispatch of one block of the instruction blocks, a number belonging to the one block is broadcast to a column of the source-view data structure that relates that block, and the column is marked accordingly. The dependency information of remaining instruction blocks is updated in accordance with the broadcast.

SUMMARY OF THE INVENTION

An embodiment of the present invention that is described herein provides a method including, in a processor that processes instructions of program code, processing a first segment of the instructions. One or more destination registers are identified in the first segment using an approximate specification of register access by the instructions. Respective values of the destination registers are made available to a second segment of the instructions only upon verifying that the values are valid for readout by the second segment in accordance with the approximate specification. The second segment is processed at least partially in parallel with processing of the first segment, using the values made available from the first segment.

In some embodiments, processing the second segment includes processing at least one instruction in the second segment, which according to the approximate specification does not depend on the values, before the values are made available. In an embodiment, verifying that a value of a destination register is valid for readout by the second segment includes verifying that all conditional branch instructions in the first segment that precede a last write to the destination register are resolved.

In another embodiment, verifying that a value of a destination register is valid for readout by the second segment includes verifying that a last write to the destination register has been fully or speculatively committed in the first segment. In yet another embodiment, verifying that the values are valid for readout by the second segment includes verifying that a last write instruction, to any of the destination registers in the first segment, has been fully or speculatively committed.

In a disclosed embodiment, processing of the second segment is performed without providing at least one of a flow-control trace and a scoreboard to the second segment. Additionally or alternatively, processing of the second segment may be performed without providing a flow-control trace to the first segment. In an embodiment, processing the second segment includes continuing processing of the second segment regardless of branch mis-prediction occurring in the first segment.

In some embodiments, the method includes flushing the second segment in response to identifying a violation of the approximate specification by the first segment. In an embodiment, the violation includes writing to a register that, in accordance with the approximate specification, is not to be written to, or writing to a register more times than a number of writes specified for the register in the approximate specification. In another embodiment, the violation includes flushing of the first segment. In yet another embodiment, flushing the second segment in response to the violation is performed only if a value of a destination register causing the violation in the first segment is actually used in the second segment.

In some embodiments, the method includes flushing the second segment in response to identifying that the first segment failed to reach a predefined location in the program code. Identifying that the first segment failed to reach the predefined location may include detecting that processing of the first segment reached an instruction that is predefined as a parallelization point for invoking one or more subsequent segments. Additionally or alternatively, identifying that the first segment failed to reach the predefined location may include detecting that processing of the first segment has processed more than a predefined amount of the program code.

In an embodiment, making the values available for readout by the second segment includes predicting at least one of the values, and, when the at least one of the values becomes valid in accordance with the approximate specification, verifying that the prediction was correct. The second segment may be flushed in response to finding that the prediction was incorrect.

There is additionally provided, in accordance with an embodiment of the present invention, a processor including an execution and parallelization circuitry. The execution pipeline is configured to execute instructions of program code. The parallelization circuitry is configured to invoke a first hardware thread to process a first segment of the instructions, to identify, using an approximate specification of register access by the instructions, one or more destination registers in the first segment, to make respective values of the destination registers available to a second hardware thread, which processes a second segment of the instructions, only upon verifying that the values are valid for readout by the second segment in accordance with the approximate specification, so as to process the second segment by the second hardware thread at least partially in parallel with processing of the first segment using the transferred values.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and devices for run-time parallelization of program code in a processor. In the disclosed embodiments, the processor parallelizes execution of instruction segments using a "scoreboard" —A specification of access to registers by the segments' instructions. The scoreboard may indicate, for example, last write indications (LWIs) of registers, i.e., the locations in the segment of the last write operations to registers. The LWI of a register is useful because it indicates the location in the segment from which the register value can be safely used by other segments.

In the disclosed embodiments, the scoreboard specifies approximate rather than exact register-access information. Approximate scoreboards are addressed in detail below, as well as in U.S. patent application Ser. No. 14/637,418, filed Mar. 4, 2015, which is assigned to the assignee of the present patent application and whose disclosure is incorporated herein by reference. In addition, the processor makes register values available from a given segment to subsequent segments only when the register values are valid for readout by the subsequent segments according to the approximate specification.

The combination of the two features above enables highly-efficient parallelization of segments. For example, although the scoreboard may be approximate in some respects, it is typically accurate in indicating which registers are not written to in a given segment. Using this information, the processor is free to parallelize subsequent segments, or portions of segments, that do not depend on registers written in the given segment.

As another example, even in the event of branch mis-prediction in the given segment, there is no need for the processor to flush subsequent segments. Since register values are transferred only when they are valid for readout, the fact that a register value has been made available from a given segment means that any branch mis-prediction detected in that segment does not affect the register value.

Nevertheless, in some embodiments the processor does decide to flush a subsequent segment under certain circumstances. The processor may flush a subsequent segment, for example, when detecting that processing of a previous segment violates the approximate scoreboard. A subsequent segment may also be flushed if a previous segment failed to reach a predefined location in the code, e.g., has exited a loop or reached a new parallelization point in which a new set of parallel segments are to be invoked. Finally, a subsequent segment may also be flushed if the entire segment from which register values were taken was flushed.

System Description

Figure 1:
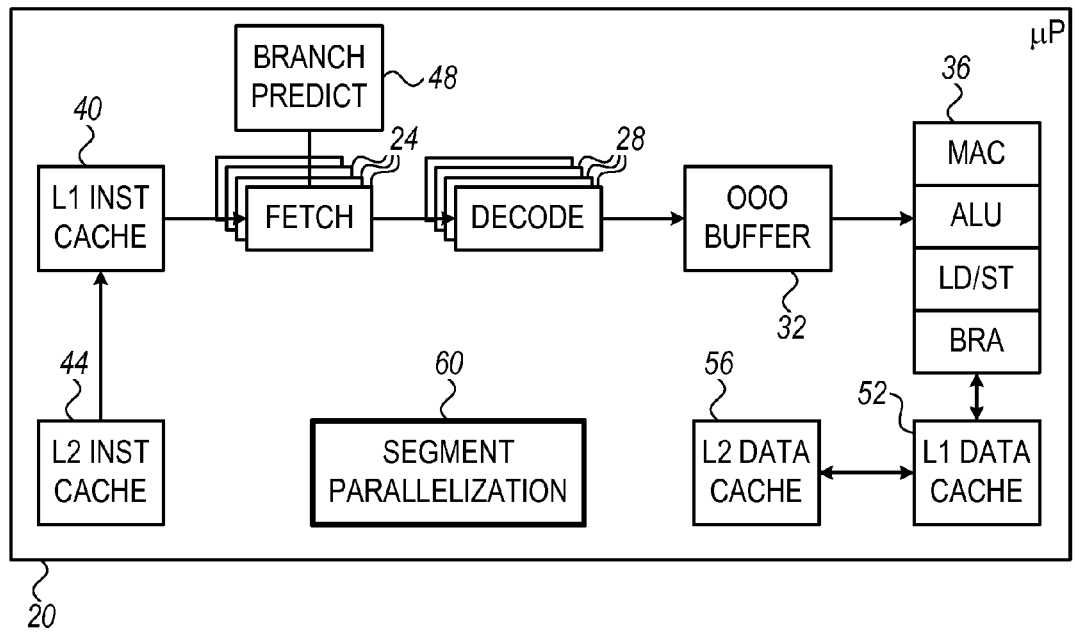
FIG. 1 is a block diagram that schematically illustrates a processor that performs run-time code parallelization, in accordance with an embodiment of the present invention.

FIG. 1 is a block diagram that schematically illustrates a processor 20, in accordance with an embodiment of the present invention. Processor 20 runs pre-compiled software code, while parallelizing the code execution. Parallelization decisions are performed by the processor at run-time, by analyzing the program instructions as they are fetched from memory and processed.

In the present example, processor 20 comprises an execution pipeline that comprises one or more fetching units 24, one or more decoding units 28, an Out-of-Order (OOO) buffer 32, and execution units 36. Fetching units 24 fetch program instructions from a multi-level instruction cache memory, which in the present example comprises a Level-1 (L1) instruction cache 40 and a Level-2 (L2) instruction cache 44.

A branch prediction unit 48 predicts the flow-control traces (referred to herein as "traces" for brevity) that are expected to be traversed by the program during execution. The predictions are typically based on the addresses or Program-Counter (PC) values of previous instructions fetched by fetching units 24. Based on the predictions, branch prediction unit 48 instructs fetching units 24 which new instructions are to be fetched. Branch prediction in this context may predict entire traces for segments or for portions of segments, or predict the outcome of individual branch instructions.

In some embodiments, instructions decoded by decoding units 28 are stored in OOO buffer 32, for out-of-order execution by execution units 36, i.e., not in the order in which they have been compiled and stored in memory. Alternatively, the buffered instructions may be executed in-order. The buffered instructions are then issued for execution by the various execution units 36. In the present example, execution units 36 comprise one or more Multiply-Accumulate (MAC) units, one or more Arithmetic Logic Units (ALU), one or more Load/Store units, and a branch execution unit (BRA). Additionally or alternatively, execution units 36 may comprise other suitable types of execution units, for example Floating-Point Units (FPU).

The results produced by execution units 36 are stored in a register file and/or a multi-level data cache memory, which in the present example comprises a Level-1 (L1) data cache 52 and a Level-2 (L2) data cache 56. In some embodiments, L2 data cache memory 56 and L2 instruction cache memory 44 are implemented as separate memory areas in the same physical memory, or simply share the same memory without fixed pre-allocation.

In some embodiments, processor 20 further comprises a segment parallelization unit 60 that is responsible for run-time code parallelization. The functions of unit 60 are explained in detail below. Parallelization unit 60 is also referred to herein as parallelization circuitry. In some embodiments, unit 60 is implemented in hardware, either as a standalone unit in processor 20 or distributed among various hardware threads.

In other embodiments, some or all of the functionality of unit 60 may be carried out using run-time software. Such run-time software is typically separate from the software code that is executed by the execution pipeline of processor 20, and may run, for example, on a separate processing core.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetch units 24 and multiple decoding units 28. Each hardware thread may comprise a fetch unit assigned to fetch instructions for the thread and a decoding unit assigned to decode the fetched instructions. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements such as reorder buffer (ROB), register renaming, to name just a few. Further alternatively, the disclosed techniques can be carried out with processors having any other suitable micro-architecture.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Run-Time Code Parallelization Based on Segment Monitoring

In some embodiments, unit 60 in processor 20 identifies a region of the code containing one or more code segments that are at least partially repetitive, and parallelizes execution of these code segments. In the context of the present patent application and in the claims, the term "parallelization" refers to both full and partial parallelization, i.e., any execution scheme that is not purely sequential.

In the context of the present patent application and in the claims, the term "segments that are at least partially repetitive" is used in a broad sense and refers to various possible scenarios in which various segments have some commonality, but do not all necessarily perform the exact same sequence of instructions. Several examples of such segments are described in FIGS. 2A-2C below.

Consider, for example, segments that comprise respective iterations of a program loop, or respective executions of a function or procedure. If the loop or function does not contain conditional branch instructions, the segments are typically repetitive, follow the same control-flow trace and perform the same sequence of instructions.

Typically, unit 60 parallelizes the execution of segments even if the segments are only partially-repetitive. Partially-repetitive segments typically have some commonality but do not necessarily follow the exact same control-flow trace. Partially-repetitive segments may, for example, begin at the same instruction and/or end at the same instruction, but otherwise may follow different traces. Examples of this sort include segments that enter or exit a loop or function at different instructions, or segments that take different branches within a loop or function.

As yet another example, unit 60 may divide a repetitive (or partially repetitive) instruction sequence into two or more successive segments, in addition to parallelizing the execution of the sequence as a whole. This collection of segments is also considered as a set of partially-repetitive segments. An example of such a scenario is illustrated in FIG. 2C below.

Further alternatively, unit 60 may identify and parallelize the execution of any other suitable region of code that comprises any other suitable set of partially-repetitive segments. Generally, data values (e.g., register values) and/or flow-control traces may differ from one segment execution to another.

In the disclosed embodiments, processor 20 parallelizes the execution of segments by invoking multiple hardware threads in parallel or semi-parallel. Each thread executes a respective code segment, e.g., a respective iteration of a loop, multiple (not necessarily successive) loop iterations, part of a loop iteration, continuation of a loop, a function or part or continuation thereof, or any other suitable type of segment.

In the example of FIG. 1, although not necessarily, each thread comprises a respective fetch unit 24 and a respective decoding unit 28 that have been assigned by unit 60 to perform one or more segments. In another example embodiment, a given fetch unit 24 is shared between two or more threads.

In practice, data dependencies exist between segments. For example, a calculation performed in a certain loop iteration may depend on the result of a calculation performed in a previous iteration. The ability to parallelize segments depends to a large extent on such data dependencies.

In some embodiments, unit 60 decides how to parallelize the code by monitoring the instructions in the processor pipeline. In response to identifying a code region that comprises segments that are at least partially repetitive, unit 60 starts monitoring the instructions as they are fetched, decoded and executed by the processor.

Figure 2A:
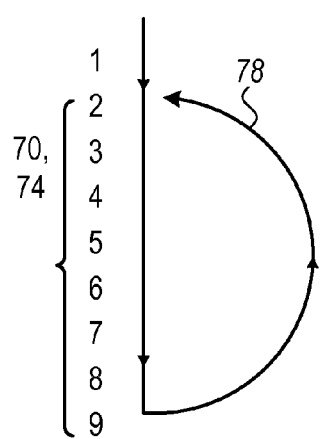
FIGS. 2A-2C are diagrams that schematically illustrate code regions containing at least partially repetitive segments, in accordance with embodiments of the present invention.
Figure 2B:
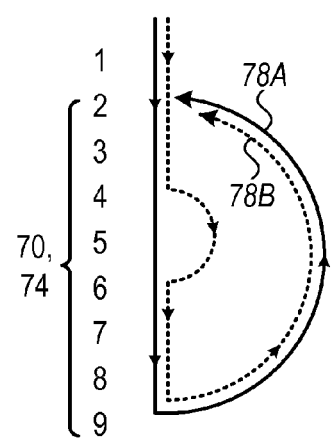
Figure 2C:
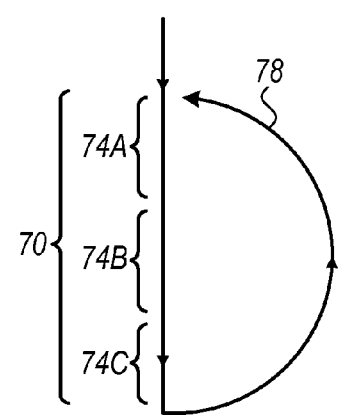

FIGS. 2A-2C are diagrams that schematically illustrate code regions 70 containing at least partially repetitive segments 74 that follow one or more control-flow traces 78, in accordance with embodiments of the present invention. These examples demonstrate several possible types of code regions that can be represented and parallelized using a single approximated scoreboard.

In FIG. 2A, code region 70 contains a loop having a single type of segment 74 that follows a single internal flow-control trace 78. Thus, the various loop iterations correspond to multiple segments that are entirely repetitive and follow the same trace.

In FIG. 2B, code region 70 contains a loop that has an internal conditional branch. As in the previous example, each loop iteration corresponds to a respective segment 74. In the present example, however, different segments may follow different flow-control traces 78A, 78B, depending on the actual branch decision taken in each segment. In this example the segments are only partially-repetitive.

In FIG. 2C, unit 60 divides the loop in code region 70 into multiple successive segment types 74A-74C. Unit 60 may invoke different threads to execute different types of segments within the same loop iteration, in addition to parallelizing the execution of different loop iterations.

In the example of FIG. 2C, the overall loop follows a single trace 78, but different segments types follow different portions of this trace. In other words, segments 74A of various loop iterations are repetitive, as are segments 74B of various loop iterations and segments 74C of various loop iterations. Different segment types, however, follow different traces. This scenario is also considered a set of partially repetitive segments.

Another example scenario may combine the cases of FIGS. 2B and 2C. In such a case, segments 74A, 74B and/or 74C may contain one or more conditional branch instructions. Therefore, segments of a given type may traverse different flow-control traces in various loop iterations. In other words, segments 74A, 74B and/or 74C may be partially-repetitive.

In the example of FIG. 2C, segments 74A, 74B and 74C do not overlap. In alternative embodiments, however, segments 74A, 74B and/or 74C may share one or more overlapping instructions. This case is addressed in greater detail below.

The scenarios of FIGS. 2A-2C above are depicted purely by way of example. In alternative embodiments, unit 60 may monitor the instructions in any other suitable kind of code region that comprises segments that are at least partially repetitive. In some embodiments, unit 60 monitors various segments separately and combines the monitoring results to produce a scoreboard for the entire code region (e.g., entire loop).

In some implementations, the functionality of unit 60 may be distributed among the multiple hardware threads, such that a given thread can be viewed as monitoring its instructions during execution. As noted above, the monitoring unit is also referred to herein as "monitoring circuitry." Nevertheless, for the sake of clarity, the description that follows assumes that monitoring functions are carried out by unit 60.

As noted above, as part of the monitoring process unit 60 generates a monitoring table referred to as a scoreboard. The scoreboard typically comprises some classification of the registers. In an embodiment, unit 60 classifies each register as Global (G), Local (L) or Global-Local (GL), and indicates the classification in the corresponding entry in the scoreboard. The classification of a register as G, L or GL depends on the order in which the register is used as an operand (whose value is read) and/or as a destination (to which a value is written) in the monitored sequence.

In an embodiment, a local (L) register is defined as a register whose first occurrence in the monitored sequence is as a destination (subsequent occurrences, if any, may be as operand and/or destination). A Global (G) register is defined as a register that is used in the monitored sequence only as an operand, i.e., the register is read but never written to. A global-local (GL) register is defined as a register whose first occurrence in the monitored sequence is as an operand, and is later used in the monitored sequence as a destination. The first and subsequent occurrences may occur in different instructions or in the same instruction, as long as the order between "first" and "subsequent" is preserved.

In an alternative embodiment, an exception to the above classification concerns a conditional instruction that uses a register as a destination. If such an instruction is the first occurrence of the register in the monitored instructions, then the register is classified as GL. Otherwise, the register is classified as local (L) as per the above rules. For example, register r2 in the instruction "mov_cond r2,#5" would be classified as GL if this instruction is the first write to r2 in the monitored instructions, and classified as L otherwise. In an alternative embodiment, if such an instruction is the first occurrence of the register in the monitored instructions, then the register is classified as GL. Otherwise, the register is classified as local only if the condition of the instruction is met. If not, the register is not classified.

In an embodiment, unit 60 uses superset classification, i.e., merges together two or more of the classes defined above. In such an embodiment, even if a given register is only local in a given segment, unit 60 still classifies it as GL for simplifying control.

An alternative way of defining the classification of registers as G, L or GL is classifying a register depending on where the dependencies of the register are generated and used relative to the currently-monitored segment: An operand that is generated outside the currently-monitored segment is classified as Global (G) or Global-Local (GL). An operand that is generated inside the currently-monitored segment is classified as Local (L).

In addition, for at least some of the registers, the scoreboard may indicate the location in the code of the last write operation to the register. Any suitable indication may be used to indicate the location of the last write operation, such as a count of the number of write operations to the register or the address of the last write operation. The last-write indication enables unit 60 to determine, for example, when it is permitted to execute an instruction in a subsequent segment that depends on the value of the register.

In some embodiments, as part of the monitoring process, unit 60 also generates the flow-control trace (or traces) traversed by the instructions in the segments of the identified region of the code. Additional aspects of scoreboard generation can be found in U.S. patent application Ser. Nos. 14/578,516, 14/578,518 and 14/583,119, which are assigned to the assignee of the present patent application and whose disclosures are incorporated herein by reference.

Approximate Specification of Code Segments

In some embodiments, unit 60 generates an approximate rather than exact scoreboard for the identified region of the code. Approximation of the specification provides tolerance to flow-control variations in the code region, reduces the computational complexity of generating the scoreboard, and/or reduces the memory space needed for storing the scoreboard. Approximation is particularly advantageous when storing and using multiple scoreboards for parallelizing multiple regions of the code.

The description that follows presents several example techniques for generating an approximated scoreboard. These techniques are depicted purely by way of example. In alternative embodiments, unit 60 may generate any other suitable register-access information in any other suitable way. Further aspects of approximate scoreboards are addressed in U.S. patent application Ser. No. 14/637,418, cited above.

In some embodiments, unit 60 indicates in the scoreboard, for at least one of the registers, only whether or not the register was written to, without specifying the location of the last write operation to the register. For example, unit 60 may specify the locations of the last write operations for a subset of the registers. For the remaining registers, unit 60 may only indicate whether each register was written to or not.

In an example embodiment, unit 60 counts the number of write operations to each register. If the number of write operations to a given register does not exceed a predefined threshold, unit 60 records this number in the scoreboard (or records some other indication of the location of the last write operation to the register). If the number of write operations to the given register exceeds the predefined threshold, unit 60 only indicates that the register was written to, without specifying the location of the last write operation. In an embodiment, unit 60 ensures that the approximate number of write operations is higher than the real number of writes.

In other embodiments, unit 60 specifies the location of the last write to the register with some coarse granularity that is coarser than a single instruction, instead of specifying the exact instructions in which the last write operations occurred. In an example embodiment, unit 60 divides a given segment into two or more sections. For each section, unit 60 may specify which registers were written to in that section and not in the subsequent sections. Put in another way, for at least a given register, unit 60 may specify the last section in which the register was written to.

In other embodiments, one or more of the last-write indications in the scoreboard indicate code locations that are possibly later than the true locations of the last write operations. For example, unit 60 may determine the locations of the last write operations based on instructions that possibly follow a mis-predicted branch. In such a case, the last write operation indicated in the scoreboard may later be flushed and not executed, and therefore the true last write operation is some earlier instruction.

In alternative embodiments, unit 60 constructs the scoreboard while considering only instructions that will be executed and not flushed. For example, unit 60 may monitor the instructions after they are committed following execution. As another example, unit 60 may identify mis-prediction events and correct the register-access information in the scoreboard to compensate for the mis-prediction. Example correction techniques are described in U.S. patent application Ser. No. 14/583,119, cited above.

In some embodiments, unit 60 may construct a single scoreboard by collecting (and later uniting) register-access information from segments that partially overlap. Because of the overlap, some of the register-access information may be duplicate, and therefore approximate. For example, when counting the number of write operations to a given register, if a write command to the register occurs in the overlap between two monitored segments, this instruction will be counted twice when uniting the register access information.

In an embodiment, unit 60 counts the exact number of write operations to a register, but records a larger number in the scoreboard. This feature provides some protection from flow-control variations and mis-prediction.

In some embodiments, unit 60 approximates the scoreboard by generating a single scoreboard for segments having different flow-control traces. For example, in the scenario of FIG. 2B above, unit 60 may generate a single approximate scoreboard for both the segments that follow trace 78A and the segments that follow trace 78B. In an embodiment, unit 60 may generate a single scoreboard for all monitored traces. In these embodiments, the scoreboard is approximate in the sense that it allows for certain variation in the control-flow trace, rather than corresponding to a single trace.

In some embodiments (e.g., in the example of FIG. 2C) unit 60 may produce the single scoreboard by adding the register-access information (e.g., number of writes) for the various segments. In other embodiments (e.g., in the example of FIG. 2B) unit 60 may produce the single scoreboard by taking the union of the register-access information (e.g., take the largest number of writes) for the various segments.

In some of these embodiments, unit 60 associates the same approximate scoreboard with two or more different traces. In an alternative embodiment, unit 60 generates a relaxed trace that comprises more than one branch option, and associates the relaxed trace with the approximated scoreboard. In some embodiments, unit 60 may merge the currently-collected register-access information with one or more previously constructed scoreboards.

When dividing a monitored segment into sections and monitoring each section separately (e.g., in FIG. 2C), the various sections may be monitored using two or more hardware threads.

In some cases, the classification of a given register may differ from one monitored segment to another in the code region. Unit 60 may use various rules or logic for deciding how to classify such a register in the composite scoreboard generated for the code region. In the scenario of FIG. 2B, for example, if a given register was classified as Global (G) in one segment and as Global-Local (GL) in another segment, unit 60 would typically classify the register as GL in the combined scoreboard. As another example, in the scenario of FIG. 2C, if a given register was not used at all in one segment and classified in a certain class in another segment, unit 60 would typically classify the register using the same class in the combined scoreboard.

In various embodiments, unit 60 may collect the register-access information based on the output of any suitable stage of the execution pipeline, and generate the corresponding trace or traces based on the output of any suitable stage of the execution pipeline. Trace generation and collection of register-access information need not be performed at the same pipeline stage. Generally speaking, monitoring instructions early in the pipeline helps to invoke parallel execution more quickly and efficiently, but on the other hand is more affected by mis-prediction. Monitoring instructions later in the pipeline causes slower parallelization, but is on the other hand less sensitive to mis-prediction.

In some embodiments, unit 60 collects the register-access information (e.g., classification of registers and locations of last write operations to registers) at the output of decoding units 28, i.e., from the instructions being decoded. In another embodiment, unit 60 collects the register-access information based on the instructions being executed in execution units 36, but before the instructions and results are finally committed. In an alternative embodiment, unit 60 collects the register-access information based only on the instructions that are committed, i.e., without considering instructions that are flushed due to mis-prediction.

In some embodiments, unit 60 generates the trace or traces from the branch instructions being fetched, i.e., based on the branch instructions at the output of fetching units 24 or branch prediction unit 48. In alternative embodiments, unit 60 generates the trace from the branch instructions being decoded, i.e., based on the branch instructions at the output of decoding units 28. In other embodiments, unit 60 generates the trace or traces after evaluating the conditions of conditional branch instructions by the branch execution (BRA) unit, i.e., at a stage where the branch instructions are no longer conditional. Further alternatively, unit 60 may generate the trace or traces based on branch instructions being committed. Finally, unit 60 may not generate a trace at all.

In some embodiments, the program code indicates at least one register for which the register-access information in the scoreboard is permitted to be approximate, and at least one register for which the register-access information should be exact. Unit 60 may select, based on these indications, which registers to specify exactly and which registers to specify approximately in the scoreboard.

Further additionally or alternatively, unit 60 may generate the flow-control trace and/or collect the register-access information based on any other suitable pipeline stages.

Run-Time Parallel Execution Based on Approximate Scoreboard

In some embodiments, unit 60 parallelizes the processing of segments in processor 20 using a combination of two mechanisms that together enable highly efficient parallelization:

Parallelization is governed by approximate, rather than exact, scoreboards.

Register values are made available from a given segment to subsequent segments only when, according to the applicable approximate scoreboard, they are valid for readout by the subsequent segments. (Examples of criteria for verifying that the value of a destination register is valid for readout are given further below.)

Typically, while a first segment is being processed by a first thread, the second segment has data dependency on operands produced in the first segment. Unit 60 identifies (using an approximate scoreboard) one or more such destination registers in the first segment and makes their values available to the second segment when they are valid for readout, i.e., there is high confidence in their validity. In the present context, the term "destination register" refers to a register that is updated in a write operation in the given segment. Unit 60 makes the values of the identified destination registers available to a second thread, which processes a second segment, only upon verifying that these values are valid for readout by the second segment (in accordance with the approximate scoreboard).

In various embodiments, unit 60 can make a register value available from one segment to one or more other segments in various ways, for example by explicitly transferring the register value, by sending a notification indicating that the values is valid, by setting a flag bit in a suitable register, or using any other suitable mechanism.

If, on the other hand, the approximate scoreboard indicates that the second segment does not depend on any destination register of the first segment, unit 60 typically allows the second thread to process the second segment in parallel with processing of the first segment. In such a scenario, the register values read by the second segment may be taken from any segment that precedes the first segment, or produced internally in the second segment. The second segment may wait for values from preceding segments to be valid for readout, as well. Additionally or alternatively, these values may be made available using any other suitable policy.

In some embodiments, although the scoreboard may be approximate in some respects, it is accurate in indicating which registers are not written to in a given segment. In such embodiments, unit 60 can safely rely on the approximate scoreboard in detecting a second segment that does not depend on any destination registers from a first segment. Thus, the second thread may process instructions in the second segment that, according to the approximate scoreboard, do not depend on the first segment, before the other register values are available.

Unit 60 may use various methods and criteria for verifying that the value of a destination register in the first segment that is needed in the second segment, i.e., a data dependency from the first segment, is valid for readout by the second segment. In an example embodiment, unit 60 may verify that all the conditional branch instructions in the first segment, which precede the last write to this register in the first segment, have been resolved (e.g., executed). In another embodiment, unit 60 may verify that the last write to the register in the first segment has been committed, i.e., will not be flushed.

Further alternatively, unit 60 may verify that the last write to the register was speculatively-committed. The term "speculatively-committed" refers to an instruction that is no longer speculative within the context of its segment. An instruction typically becomes speculatively-committed after all preceding branches in the segment have been resolved and all preceding instructions in the segment have been executed. The conditions for a speculatively-committed instruction are different from the conditions for a fully-committed instruction. For example, an instruction may be speculatively-committed even if one or more preceding instructions (belonging to one or more previous segments) are not yet processed (not yet fetched, decoded or executed). Unlike a fully-committed instruction, a speculatively-committed instruction may still be flushed, e.g., because the entire segment is flushed. In some embodiments, although not necessarily, speculatively-committed instructions are committed to a speculative register file.

In some embodiments, the approximate scoreboard may specify, for different registers, different states in the code at which the register value can be made available to subsequent segments so as to resolve the data dependency. States in the code that can be specified individually per register comprise, the end of a loop, after speculative commit, after speculative commit of the first instruction of an inner loop, or any other suitable state. The criteria above, for verifying that a destination register value is valid for readout, relate to the last write to the register, and can thus be evaluated using the LWI of the register in question in the scoreboard. Further alternatively, unit 60 may verify whether the value of a destination register in the first segment is valid for readout by the second segment in any other suitable way. In some embodiments, the policy used by unit 60 to decide whether a register value is valid for readout may differ from one register to another, and/or from one segment to another. Further alternatively, unit 60 may use any other mechanism that increases the confidence of the validity of the register in order to decide that the register is valid for readout In some embodiments, if the second segment does depend on a destination register from the first segment, the second thread may process the second segment up to the location in which the value of the destination register is needed. Only at this point, processing of the second segment would be stalled until the value of the destination register becomes valid in the first segment and made available to the second thread.

In some embodiments, the second thread processes the second segment without being given a flow-control trace and/or a scoreboard. For example, the first thread processing the first segment may process a function for which there exists a flow-control trace and an approximate scoreboard, while the second thread may process the function continuation (the code following return from the function). The second thread in this example does not need any flow-control trace and a scoreboard since it is only a consumer and does not need to transfer a last-write indication to any future segment.

Additionally or alternatively, the second segment may be processed without having a flow-control trace for the first segment. In fact, the second thread typically has no use for the flow-control trace that the first thread traverses, and is only waiting for the validity of the register. In some embodiments, the flow-control prediction is needed in order to understand when wrong register values were made available to future segments, so as to flush them.

In some embodiments, since register values are made available to the second segment only when they are valid for readout, unit 60 continues to process the second segment (as opposed to flushing it) even if branch mis-prediction occurs in processing of the first segment. In these embodiments, unit 60 uses the fact that a register value could not have been be transferred to the second segment unless it is valid for readout. In other words, the fact that a register value has been transferred from the first segment means that the branch mis-prediction in the first segment does not affect this register value.

In some embodiments, unit 60 may nevertheless flush the second segment under certain circumstances. Some reasons for flushing have to do with the fact that the scoreboard is approximate, and may be violated during execution. In some embodiments, unit 60 flushes the second segment in response to detecting that processing of the first segment violated the approximate scoreboard. Not every violation, however, necessarily leads to flushing of the second segment.

For example, the scoreboard may indicate that a certain register is written N times, but during actual execution the first segment writes to this segment more than N times. Unit 60 may flush the second segment upon detecting such a violation. In an embodiment, unit 60 flushes the second segment only if the violation pertains to a destination register in the first segment that is read in the second segment. In another embodiment, unit flushes the second segment upon detecting such a violation regardless of (and typically without checking) whether the violation pertains to a register that is read in the second segment.

In another embodiment, unit 60 flushes the second segment if the first segment writes to a register that should not be written to at all in accordance with the approximate scoreboard. If, however, the scoreboard specified that a register should be written to N times, and the actual number of writes by the first segment is smaller than N, unit 60 does not flush the second segment.

Additionally or alternatively, unit 60 may flush the second segment if the first segment fails to reach a predefined location in the code. Consider, for example, a scenario in which the first and second segments correspond to respective iterations of a program loop. If the first segment does not take the backward branch of the loop, e.g., exits the loop prematurely or does not take the branch (branch not taken—NT), unit 60 will typically flush the second segment.

As another example, unit 60 may detect that processing of the first segment has reached a new parallelization point, i.e., a new region of the code that comprises a new set of segments to be parallelized. In this scenario, too, unit 60 will typically flush the second segment. Additionally or alternatively, unit 60 may flush the second segment when processing of the first segment reaches any other suitable predefined location in the code.

As yet another example, unit 60 may flush the second segment when processing of the first segment processed more than a predefined amount of code (e.g., more than a predefined number of instructions, micro-ops, branches or any other type of instruction or other operation, such as usage of system registers, usage of instructions such as barriers, fences or page crossing in the cache).

As noted above, register values are typically made available from segment to segment only when they are valid for readout. In some practical scenarios, this constraint may limit the parallelization performance substantially. Therefore, in some embodiments, unit 60 predicts the values that one or more destination registers will have at the end of the first segment, and makes the predicted values available to the second thread before they become truly valid. The second thread processes the second segment using the predicted values. When the values of the registers in question become valid for readout in the first segment, unit 60 verifies that the value prediction was correct by comparing the actual values with the predicted values. If one or more of the values do not match, i.e., if the prediction was incorrect, unit 60 flushes the second segment.

Figure 3:
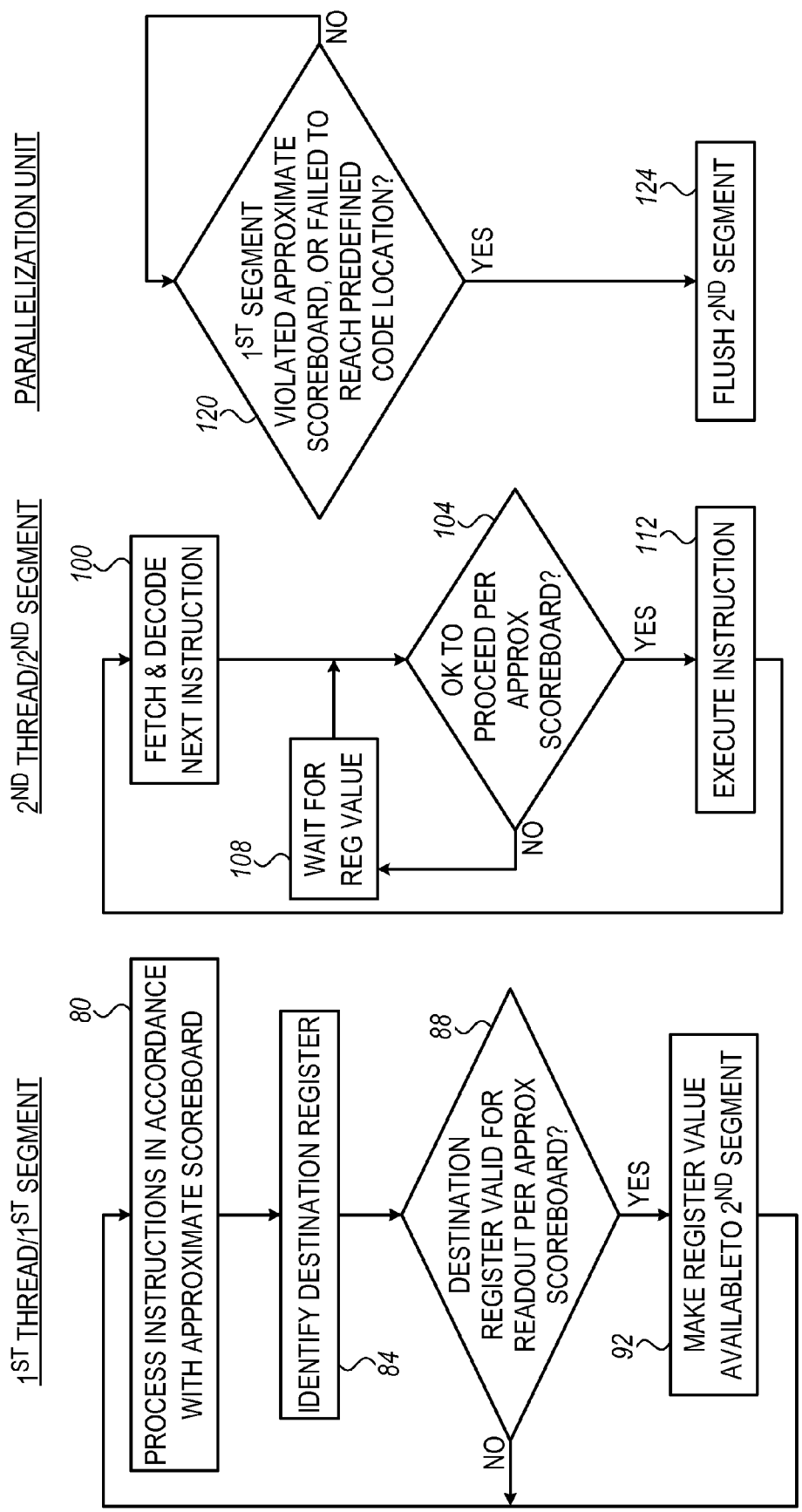
FIG. 3 is a flow chart that schematically illustrates a method for run-time code parallelization using an approximate register-access specification, in accordance with an embodiment of the present invention.

FIG. 3 is a flow chart that schematically illustrates a method for run-time code parallelization using an approximate register-access specification, in accordance with an embodiment of the present invention. The figure demonstrates the roles played in parallel by the first thread that processes the first segment, the second thread that processes the second segment, and parallelization unit 60, in one example embodiment.

The figure refers to a single producer segment (first segment), a single consumer segment (second segment) and a single register value being transferred, for the sake of clarity. In real-life implementations, a similar process is often carried out with multiple producer segments, multiple consumer segments and multiple register values. For example, once a destination register value becomes ready for readout in a producer segment, it is typically transferred to any desired number of consumer segments that need to read it.

Note also that the division of tasks between the threads and the parallelization unit can be divided in other suitable ways. For example, some tasks that are shown in the figure as being performed by the threads (e.g., identifying destination registers, verifying whether their values are valid for readout by subsequent segments, etc.) can also be performed by parallelization unit 60. As noted above, in some embodiments the functionality of unit 60 is distributed and performed by the hardware threads.

The left-hand-side of the figure shows the role of the first thread. The first thread processes the instructions of the first segment while verifying compliance with the applicable approximate scoreboard, at a first segment processing step 80. At an identification step 84, the first thread identifies a destination register. At a validity checking 88, the first thread checks whether the identified destination register is valid for readout by subsequent segments.

If not yet valid, the method loops back to step 80 above and processing of the first segment proceeds. If the register value is valid for readout, the value is made available to the second segment, at a value enabling step 92. As explained above, unit 60 can make the register value available to the second segment, for example, by explicitly transferring the register value, by sending a notification that the values is valid, by setting a validity bit in some physical register, or in any other suitable way.

The middle of the figure shows the role of the second thread. At a fetching & decoding step 100, the second thread fetches and executes the next instruction of the second segment. At a checking step 104, the second thread checks whether, according to the approximate scoreboard, it is permitted to execute the decoded instruction. In the present example, the second thread checks whether the instruction comprises a read instruction from a register whose value is produced by a previous segment and, if so, whether the register value is currently valid for readout. If valid, the second thread executes the instruction, at an execution step 112, and the method loops back to step 100. If not valid, the second thread stalls and waits for the register value, at a stalling step 108. In out-of-order processing the second thread may execute other instructions during the time it waits.

The right-hand-side of the figure shows the role of parallelization unit 60. At a flushing checking step 120, unit 60 checks whether the second segment is to be flushed. As explained above, unit 60 may check, for example, whether the first segment has violated the approximate scoreboard or has failed to reach a predefined location in the code. If any of these events occur, unit 60 flushes the second segment, at a flushing step 124.

As explained above, in some embodiments unit 60 makes the destination register values of the first segment available to the second segment only when the entire segment is fully (or speculatively) committed, i.e., when the last write operation in the segment, to any of the destination registers, is fully (or speculatively) committed. In other embodiments, the first segment is divided into two or more sections, and the above mechanism is applied per section. In these embodiments, when a given section is fully (or speculatively) committed, unit 60 chooses the registers that are written to in the given section and not written to in subsequent sections, and makes their values available to the second segment.

As noted above, unit 60 may use different policies for different registers. For example, value prediction can be used for registers that would otherwise stall the second thread for a long time. Immediate indication can be used for registers that have the same LWI on all scoreboards, or that have reached the highest LWI among all scoreboards. Some register values may be made available upon speculative commit, and others upon full commit.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a processor that processes instructions of program code, processing a first segment of the instructions;
   constructing an approximate specification that defines register access by the instructions in the first segment by indicating for one or more destination registers that a respective number of writes in the first segment to each of the one or more destination registers exceeded a predefined threshold, without specifying the respective number;
   making respective values of the one or more destination registers available to a second segment of the instructions only upon verifying that the values are known to be valid for readout by the second segment even though the approximate specification is not exact in pointing to the instructions that are last to write to the destination registers; and
   processing the second segment at least partially in parallel with processing of the first segment, using the values made available from the first segment.

2. The method according to claim 1, wherein processing the second segment comprises processing at least one instruction in the second segment, which according to the approximate specification does not depend on the values, before the values are made available.

3. The method according to claim 1, wherein verifying that a value of a destination register is valid for readout by the second segment comprises verifying that all conditional branch instructions in the first segment that precede a last write to the destination register are resolved.

4. The method according to claim 1, wherein verifying that a value of a destination register is valid for readout by the second segment comprises verifying that a last write to the destination register has been fully committed in the first segment.

5. The method according to claim 1, wherein verifying that the values are valid for readout by the second segment comprises verifying that a last write instruction, to any of the destination registers in the first segment, has been fully or speculatively committed.

6. The method according to claim 1, wherein processing of the second segment is performed without providing at least one of a flow-control trace and a scoreboard to the second segment.

7. The method according to claim 1, wherein processing of the second segment is performed without providing a flow-control trace to the first segment.

8. The method according to claim 1, wherein processing the second segment comprises continuing processing of the second segment regardless of branch mis-prediction occurring in the first segment.

9. The method according to claim 1, and comprising flushing the second segment in response to identifying a violation of the approximate specification by the first segment.

10. The method according to claim 9, wherein the violation comprises writing to a register that, in accordance with the approximate specification, is not to be written to, or writing to a register more times than a number of writes specified for the register in the approximate specification.

11. The method according to claim 9, wherein the violation comprises flushing of the first segment.

12. The method according to claim 9, wherein flushing the second segment in response to the violation is performed only if a value of a destination register causing the violation in the first segment is actually used in the second segment.

13. The method according to claim 1, and comprising flushing the second segment in response to identifying that the first segment failed to reach a predefined location in the program code.

14. The method according to claim 13, wherein identifying that the first segment failed to reach the predefined location comprises detecting that processing of the first segment reached an instruction that is predefined as a parallelization point for invoking one or more subsequent segments.

15. The method according to claim 13, wherein identifying that the first segment failed to reach the predefined location comprises detecting that processing of the first segment has processed more than a predefined amount of the program code.

16. A processor, comprising:
an execution pipeline, which is configured to execute instructions of program code; and
parallelization circuitry, which is configured to invoke a first hardware thread to process a first segment of the instructions, to construct an approximate specification that defines register access by the instructions by indicating for one or more destination registers that a respective number of writes in the first segment to each of the one or more destination registers exceeded a predefined threshold, without specifying the respective number, to make respective values of the one or more destination registers available to a second hardware thread, which processes a second segment of the instructions, only upon verifying that the values are known to be valid for readout by the second segment even though the approximate specification is not exact in pointing to the instructions that are last to write to the destination registers, so as to process the second segment by the second hardware thread at least partially in parallel with processing of the first segment using the respective values.

17. The processor according to claim 16, wherein the parallelization circuitry is configured to invoke the second thread to process at least one instruction in the second segment, which according to the approximate specification does not depend on the values, before the values are made available.

18. The processor according to claim 16, wherein the parallelization circuitry is configured to verify that a value of a destination register is valid for readout by the second segment, by verifying that all conditional branch instructions in the first segment that precede a last write to the destination register are resolved.

19. The processor according to claim 16, wherein the parallelization circuitry is configured to verify that a value of a destination register is valid for readout by the second segment, by verifying that a last write to the destination register has been fully committed in the first segment.

20. The processor according to claim 16, wherein the parallelization circuitry is configured to verify that the values are valid for readout by the second segment, by verifying that a last write instruction, to any of the destination registers in the first segment, has been fully or speculatively committed.

21. The processor according to claim 16, wherein processing of the second segment is performed without providing at least one of a flow-control trace and a scoreboard to the second segment.

22. The processor according to claim 16, wherein processing of the second segment is performed without providing a flow-control trace to the first segment.

23. The processor according to claim 16, wherein processing of the second segment continues regardless of branch mis-prediction occurring in the first segment.

24. The processor according to claim 16, wherein the parallelization circuitry is configured to flush the second segment in response to identifying a violation of the approximate specification by the first segment.

25. The processor according to claim 24, wherein the violation comprises writing to a register that, in accordance with the approximate specification, is not to be written to, or writing to a register more times than a number of writes specified for the register in the approximate specification.

26. The processor according to claim 16, wherein the parallelization circuitry is configured to flush the second segment in response to identifying that the first segment failed to reach a predefined location in the program code.

27. The processor according to claim 26, wherein the parallelization circuitry is configured to identify that the first segment failed to reach the predefined location by detecting that processing of the first segment reached an instruction that is predefined as a parallelization point for invoking one or more subsequent segments.

* * * * *